United States Patent
Wadsley et al.

(10) Patent No.: US 12,511,330 B2
(45) Date of Patent: Dec. 30, 2025

(54) COMPUTER-BASED SYSTEMS AND/OR COMPUTING DEVICES CONFIGURED FOR ASSEMBLING AND EXECUTING DIRECTED ACYCLIC GRAPH RECIPES FOR ASSEMBLING FEATURE DATA FOR PATTERN RECOGNITION MODELS

(71) Applicant: Capital One Services, LLC, McLean, VA (US)

(72) Inventors: Fergus Logan Wadsley, Nottingham (GB); Krishan Bhasin, Nottingham (GB); Chen Chen, Nottingham (GB); Thomas Perrett, Nottingham (GB); Robert Noble-Eddy, Nottingham (GB)

(73) Assignee: Capital One Services, LLC, McLean, VA (US)

( * ) Notice: Subject to any disclaimer, the term of this patent is extended or adjusted under 35 U.S.C. 154(b) by 1236 days.

(21) Appl. No.: 17/320,549

(22) Filed: May 14, 2021

(65) Prior Publication Data

US 2022/0365974 A1    Nov. 17, 2022

(51) Int. Cl.
*G06F 16/901* (2019.01)
*G06F 16/21* (2019.01)
(Continued)

(52) U.S. Cl.
CPC ........ *G06F 16/9024* (2019.01); *G06F 16/211* (2019.01); *G06N 5/04* (2013.01); *G06N 20/00* (2019.01)

(58) Field of Classification Search
CPC ..... G06F 16/9024; G06F 16/211; G06N 5/04; G06N 20/00
See application file for complete search history.

(56) References Cited

U.S. PATENT DOCUMENTS 11,790,210 B1 * 10/2023 Klein ................ G06N 3/082
706/12
2017/0134329 A1 * 5/2017 Edgar ................ H04L 51/226
(Continued)

OTHER PUBLICATIONS

Saturncloud, "Analyze Big Data with Dask", Mar. 3, 2020, pp. 1-12 <<https://www.saturncloud.io/s/big-data-with-dask/>>.
(Continued)

*Primary Examiner* — Hien L Duong
(74) *Attorney, Agent, or Firm* — Greenberg Traurig, LLP

(57) ABSTRACT

An example method includes receiving a feature definition that defines desired model feature data. The method further includes receiving transformation information for performing at least one transformation on raw data that generates the desired model feature data. The method further includes receiving source information including a raw data structure definition identifying a data arrangement of the raw data. The method further includes generating a machine learning data assembling software object based at least in part on the feature definition, the transformation information, and the source information. The method further includes generating feature data including the desired model feature data from the raw data based on the machine learning data assembling software object. The generating of the feature data includes retrieving the raw data based on the source information and transforming the raw data based on the transformation information to generate the desired model feature data according to the feature definition.

18 Claims, 7 Drawing Sheets

(51) Int. Cl.
  *G06N 5/04* (2023.01)
  *G06N 20/00* (2019.01)

(56) References Cited

U.S. PATENT DOCUMENTS

| | | | |
|---|---|---|---|
| 2019/0114335 A1* | 4/2019 | Koenig | G06F 16/24532 |
| 2020/0184272 A1* | 6/2020 | Zhang | G06N 20/00 |
| 2020/0184376 A1* | 6/2020 | Parameswaran | G06N 20/00 |
| 2020/0285943 A1* | 9/2020 | Perera | G06N 3/048 |
| 2020/0293712 A1* | 9/2020 | Potts | G16H 10/60 |
| 2021/0042155 A1* | 2/2021 | Wang | G06F 9/5016 |
| 2021/0117382 A1* | 4/2021 | Sriharsha | G06F 9/544 |
| 2021/0141838 A1* | 5/2021 | Atallah | G06F 16/9024 |
| 2021/0287107 A1* | 9/2021 | Badawy | G06F 16/2379 |
| 2021/0303346 A1* | 9/2021 | Shahim | G06F 9/485 |
| 2021/0374127 A1* | 12/2021 | Mavrommatis | G06F 9/541 |
| 2021/0374600 A1* | 12/2021 | Wisniewski | G06F 16/254 |
| 2022/0129766 A1* | 4/2022 | Potts | G16H 70/60 |
| 2022/0245153 A1* | 8/2022 | Bangalore | G06F 16/2445 |
| 2023/0004574 A1* | 1/2023 | Hu | G06F 8/433 |
| 2023/0252140 A1* | 8/2023 | Coulter | G06F 21/554 726/23 |

OTHER PUBLICATIONS

Vashishta, "Dask and DAGs—Best Practices For Distributed Machine Learning", 2020, pp. 1-5 <<https://www.linkedin.com/pulse/dask-dags-best-practices-distributed-machine-vin-vashishta>>.

"Credit Modeling with Dask complex task graphs in the real world", 2018, pp. 1-10 <<https://matthewrocklin.com/blog/work/2018/02/09/credit-models-with-dask>>.

* cited by examiner

COMPUTER-BASED SYSTEMS AND/OR COMPUTING DEVICES CONFIGURED FOR ASSEMBLING AND EXECUTING DIRECTED ACYCLIC GRAPH RECIPES FOR ASSEMBLING FEATURE DATA FOR PATTERN RECOGNITION MODELS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved computer-based platforms/systems, improved computing devices/components and/or improved computing objects configured for one or more novel technological applications of assembling and executing directed acyclic graph recipes for assembling feature data for pattern recognition models.

BACKGROUND OF TECHNOLOGY

A computer network platform/system may include a group of computers (e.g., client devices (e.g., laptops, desktop computers, tablets, smartphone devices, internet of things (IOT) devices, etc.), servers, wireless routers or other networking devices) and other computing hardware devices that are linked together through one or more communication channels to facilitate communication and/or resource-sharing, including for assembling and executing computing recipes for assembling feature data according to the present disclosure.

SUMMARY OF DESCRIBED SUBJECT MATTER

In some embodiments, the present disclosure provides an exemplary technically improved computer-based method that includes at least receiving, by a machine learning processor, a feature definition that defines desired model feature data for a machine learning model. The method further includes receiving, by the machine learning processor, transformation information including transformation instructions for performing at least one transformation that, upon application of the at least one transformation to raw data, generates the desired model feature data. The method further includes receiving, by the machine learning processor, raw data source information including a raw data structure definition identifying a data arrangement of the raw data. The method further includes generating, by the machine learning processor, a machine learning data assembling software object based at least in part on the feature definition, the transformation information, and the raw data source information. The method further includes generating, by the machine learning processor, feature data including the desired model feature data from the raw data based on the machine learning data assembling software object. The generating of the feature data includes retrieving the raw data based on the raw data source information and transforming the raw data based on the transformation information to generate the desired model feature data according to the feature definition.

In some embodiments, the present disclosure provides an exemplary technically improved computer-based system that includes at least the following components of a memory and at least one processor coupled to the memory. The processor is configured to receive a feature definition that defines desired model feature data for a machine learning model. The processor is further configured to receive transformation information including transformation instructions for performing at least one transformation that, upon application of the at least one transformation to raw data, generates the desired model feature data. The processor is further configured to receive raw data source information including raw data source information including a raw data structure definition identifying a data arrangement of the raw data. The processor is further configured generate a machine learning data assembling software object based at least in part on the feature definition, the transformation information, and the raw data source information.

In some embodiments, the present disclosure provides an exemplary technically improved non-transitory computer readable medium having instructions stored thereon that, upon execution by a computing device, cause the computing device to perform operations including generating feature data including desired model feature data from raw data using a machine learning data assembling software object. The machine learning data assembling software object includes a feature definition that defines the desired model feature data for a machine learning model. The machine learning data assembling software object further includes transformation information including transformation instructions for performing at least one transformation that, upon application of the at least one transformation to the raw data, generates the desired model feature data. The machine learning data assembling software object further includes raw data source information including a raw data structure definition identifying a data arrangement of the raw data. The generating of the feature data includes retrieving the raw data based on the raw data source information and transforming the raw data retrieved from a database based on the transformation information to generate the desired model feature data according to the feature definition.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
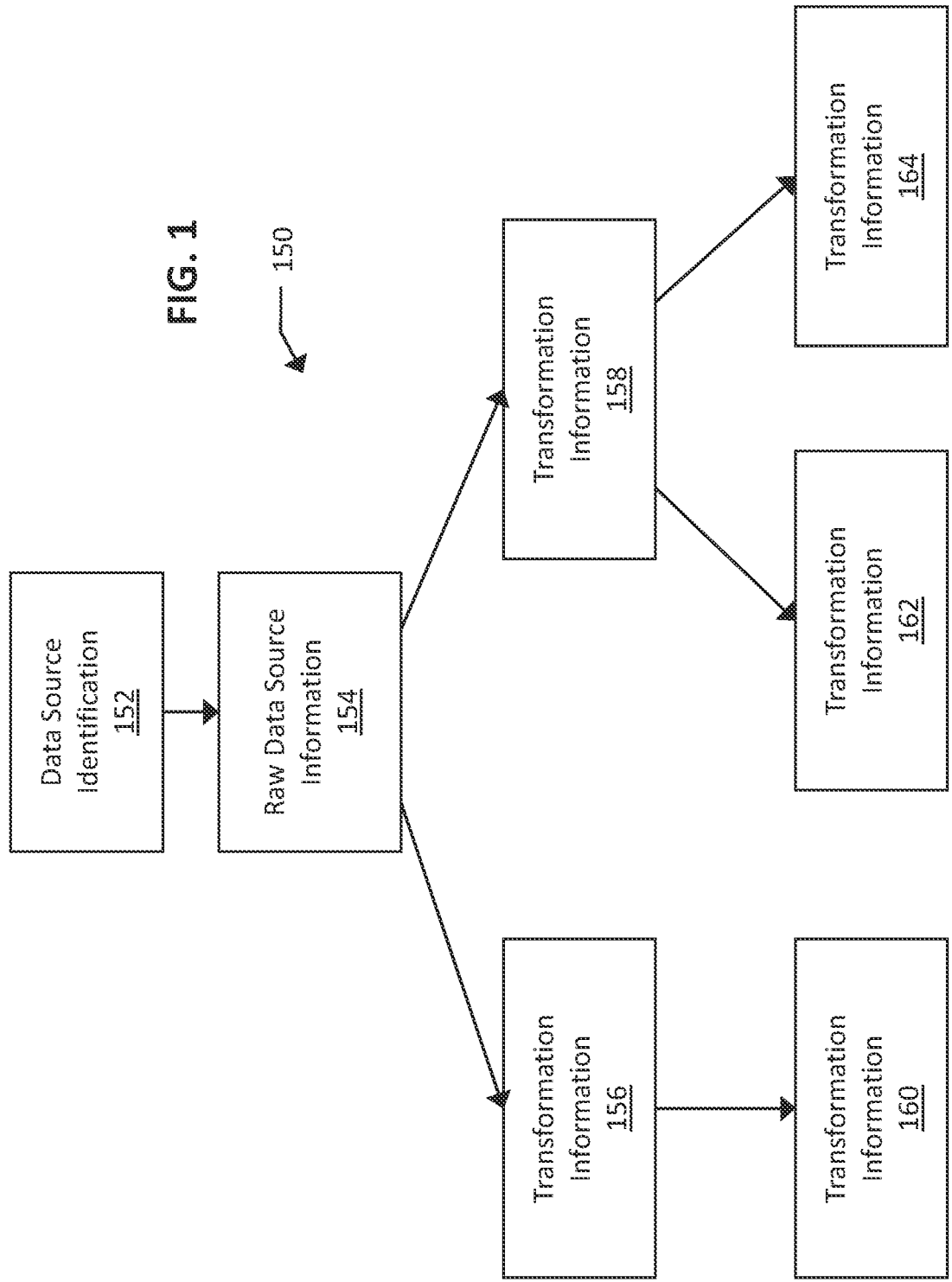
FIG. 1 is a diagram illustrating a directed acyclic graph (DAG) recipe for assembling feature data for pattern recognition models in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

Described herein are methods, systems, computer readable media, etc. for assembling and executing directed acyclic graph (DAG) recipes for assembling feature data for pattern recognition models. Various embodiments described herein include technical aspects that may reduce the computing used to assemble data that is desired to input into machine learning or other pattern recognition models. The various embodiments described herein further include technical aspects that reduce the number of interactions that may be taken by a user of a system to assemble data that is desired for use in machine learning or other pattern recognition models. As such, the computing power used, number of computing devices or nodes used, time spent querying a data source, etc. may all be reduced using the systems, methods, and computer readable media described herein. In addition, the various embodiments described herein include various aspects that may be reused or repurposed when the same, similar, or additional data may be desired for use in machine learning or other pattern recognition models. In this way, time and computing resources may be reduced when first acquiring desired data, as well as in subsequently acquiring data that is the same, similar, or from a same or similar data source as described herein.

In particular, the methods, systems, and computer readable media described herein include building a machine learning data assembling software object that includes instructions for generating and/or acquiring desired feature data for use in machine learning or other pattern recognition models. For example, machine learning or other pattern recognition models may be configured to receive large amounts of data, referred to herein as feature data, to recognize patterns, trends, etc. in the feature data. Feature data may be individual, measurable properties used in machine learning and pattern recognition. The feature data may often be voluminous and difficult to assemble. For example, various third party sources of data may be used that may have limited or throttled access, the desired feature data may be a limited subset of all data stored in a particular data source, etc. In addition, various pre-processing of the feature data may be desirable to format or otherwise get the data into a form that is desirable for a given machine learning model or other pattern recognition model. For example, some data sources may include erroneous data, null data, or data that is otherwise not formatted in a manner that will be recognizable or usable by a machine learning or other pattern recognition model. Thus, the assembling of desired feature data and formatting that data appropriately may be a costly task in both time and computing resources.

As an example, feature data may be related to a number of peoples' credit score, and a machine learning or pattern recognition model may use the credit scores to determine characteristics of a credit score that are indicative of various things, such as whether a person is likely to default on a loan, pre-pay a loan, miss payments on a loan, etc. Other feature data may also be used, and the feature data may be used to determine correlations or patterns for any type of desired behavior, or machine learning and pattern recognition models may use feature data to recognize patterns that are not even known prior to the machine learning model processing the feature data.

Feature data, such as credit scores, may represent a large data set. For example, for a large number of people, each individual may have credit scores that change over time, such that each individual has many credit scores at different times. For a particular machine learning or pattern recognition model, a credit score at a certain date, an average credit score over a certain date range, multiple credit scores (either at discrete times and/or different averages), etc. may be desired for inputting into a machine learning or other pattern recognition model. As such, as data set may be large, and pre-processing may be used to take raw data and distill it down to the desired feature data. Such acquisition and pre-processing of data may be a time consuming and computer processing resource intensive process.

Previously, pulling and sorting data for relevant features may be difficult and time consuming, as large databases or tables must be polled for large amounts of feature data. In addition, some prior systems may include a large number of potential features for which data is pulled and initial analysis of those features is done to determine which features will be used to input fully into the machine learning or pattern recognition models. As just one example, one thousand or more feature data candidates may be defined using structured query language (SQL) code. The SQL code may be executed to automatically query and pull at least samples of the one thousand or more feature data candidates. That data may be studied to determine which of the feature data candidates may be selected to study more fully using a machine learning model. Thus, all data (not just a sample) of the selected feature data may then be pulled. However, to do so, the original SQL code designed to define and query for the one thousand sample feature data candidates must be revised to only pull the selected feature data. Such a process of rewriting the SQL code to pull the proper feature data may be time consuming, difficult, and error prone. Accordingly, described herein are various embodiments for easy to define recipes for pulling feature data that does not require rewriting and untangling SQL code once specific desired feature data is determined. Similarly, the SQL code often used to pull and aggregate feature data may also be difficult to revise if the desired feature data changes, and data must be pulled and processed all over again. In the embodiments herein, only the necessary data pulling and processing steps needed for a changed or added feature data may be performed when desired feature data changes.

SQL code may also be difficult to test or otherwise analyze in an automated fashion. Thus, rewriting or otherwise trying to reuse SQL code or portions of SQL code for pulling feature data must often be performed manually. Such reusing of or rewriting of SQL code may therefore also be error prone. In addition, depending on how SQL code is structured when written or rewritten, aggregation of or pre-processing of data may result in redundant or repetitive steps that may slow down the process of acquiring usable feature data. For example, SQL code may be inefficiently structured such that, for example, if both a minimum and maximum credit score over a past year for a group of people is desired as feature data, the SQL may be structured to pull credit score data for the past year twice and performing the minimum and maximum analysis on the two sets of redundant data pulled. The various embodiments herein advantageously provide for minimizing the data aggregation, pulling, and processing steps required to assemble various desired feature data.

Furthermore, SQL code or similar methods for pulling, aggregating, and processing desired feature data may inherently incorporate knowledge of how a data source (e.g., a database) is structured without being immediately apparent when viewing the SQL code. For example, a database may format null values or dates in a particular way that is taken into account when SQL code to pull feature data is originally written. However, if someone goes into the SQL code to revise it, that person may or may not have an understanding of the underlying data structure assumptions made when the SQL code was originally written. As such, revisions to the SQL code may not work correctly or may be subject to trouble shooting to get it to work correctly. Additionally or alternatively, someone may have to study the data source and its formatting to determine how to properly modify SQL code to get it to pull the desired feature data from the data source.

In contrast, described herein are various embodiments for using metadata that may be human and computer readable as instructions for a process or recipe that, when executed, can assemble and process raw data into desired feature data in a way that uses less computing resources and is easier to modify by a user and understand by a user. In particular, the process or recipe steps for assembling desired feature data may be written as YAML files, which are readable by a human and indicate the type of data request or data transformation being performed. Various YAML files representing different instructions for pulling data or performing data transformations may be assembled or chained together to define an overall recipe or process for acquiring or assembling desired feature data. For example, some YAML files may include instructions on where and how to acquire raw data from a data source, and such YAML files may be chained with other YAML files that process the data to get desired feature data.

The chained together YAML files may create a directed acyclic graph (DAG) object, which is a graph with no directed cycles. In other words, from each step (or YAML file) in a DAG object, there is an endpoint to the process, and the DAG does not cycle back on itself. Thus, the DAG object of YAML files may be executed to reach the desired endpoints of the featured data. As described herein the YAML files or process steps may be easy to understand and interpret for future users, reducing the amount of time and effort needed to modify a recipe or process for desired feature data. In addition, as described further herein, the YAML files may reuse common components, retrieved raw data, and/or data transformations to reduce the amount of computing resources and/or time needed to assemble a large amount of desired feature data.

In addition, the DAG recipes/processes/objects described herein may also be implemented using a parallel computing architecture, such as a Dask Python library. Using a parallel computing architecture, various recipe/process steps (e.g., a group of the YAML files that are associated with individual steps of a recipe/process) may be processed in parallel with one another, rather than processing a step only after a previous step has completed. Such methods further reduce the amount of time and/or computing resources that may be required to assemble desired feature data.

The various embodiments described herein therefore provide improved technical solutions for various technical problems that occur in previous methods for assembling desired feature data. As another example, because the YAML files are more easily understood by humans, the YAML files may be changed, reorganized, reused, added to, etc. in various recipes or processes for acquiring feature data much more efficiently than prior code could be reused. Thus, the technical aspects of using the YAML files can reduce the amount of time and effort required to acquire feature data for machine learning or other pattern recognition models. The embodiments described herein may also advantageously reduce the number of clicks, touches, or other interactions taken by a user to set up processes or recipes to acquire feature data.

Because the embodiments described herein may result in fewer computational or data acquisition (e.g., call/response) steps implemented by one or more computing devices or nodes, the embodiments herein may improve the functioning of various electronic devices. For example, if feature data acquisition is performed using cloud computing resources, fewer nodes may need to be used to perform various tasks, allowing an overall cloud system to function more efficiently. In particular, servers or other computing devices that are part of a cloud system or other computing system may see decreased loads due to less information being processed and/or stored. As such, multiple computing devices may functionally improve based on the systems, methods, and computer readable media described herein. A processor that handles or executes any machine learning related software applications (including, e.g., building a recipe as described herein, executing a recipe as described herein, or otherwise assembling and using feature data or raw data) may be referred to herein as a machine learning processor.

As such, the methods, systems, and computer readable media described herein represent demonstrable technological improvements over prior systems for assembling feature data. In other words, the embodiments herein provide for a particular manner of assembling feature data that result in the technical benefits described herein as opposed to conventional or known feature data assembly methods.

In various embodiments, different aspects are described with respect to FIGS. 4-7 that are described in further detail below. Any combination of the various computing components and aspects of FIGS. 4-7 may be used various embodiments described herein. For example, users may use any of client devices 102, 103, 104, or 202*a* through 202*n* to define YAML files and/or otherwise define recipes or processes for retrieving, assembling, and/or processing desired feature data as described herein. The client devices 102, 103, 104, or 202*a* through 202*n* may communicate with server devices 106, 107, 204, or 213; network databases 207 or 215; and/or one or more cloud components 225 through the networks 105 or 206. Any of the server devices 106, 107, 204, or 213; the network databases 207 or 215; and/or the one or more cloud components 225 may execute or implement the recipes or processes described herein (including, e.g., the YAML files, the Dask Python libraries, etc.) to retrieve, assemble, and/or process desired feature data as described herein. In various embodiments, the client devices 102, 103, 104, or 202*a* through 202*n* may additionally or alternatively be used to implement or execute the recipes or processes described herein as well. In any event, one or more of the computing devices, systems, etc. may be in communication with any or all of the other devices shown in FIGS. 4-7 to implement the systems and methods described herein. For example, a data source may be stored on one or more computing devices (e.g., the server devices 106, 107, 204, or 213; the network databases 207 or 215), and data may be retrieved and processed by another computing device and/or the cloud components 225. The components shown in FIGS. 4-7 are described in greater detail below after the discussions of FIGS. 1-3.

FIG. 1 is a diagram illustrating a directed acyclic graph (DAG) recipe 150 for assembling feature data for pattern recognition models in accordance with one or more embodiments of the present disclosure. The DAG recipe 150 includes blocks that represent various types of data and/or information for recipe or process steps that may be executed to perform various operations, for example, using the various components shown in and discussed below with respect to FIGS. 4-7. Any of the blocks shown in FIG. 1 may represent or may be YAML code blocks or any other type of code. For example, the code blocks of FIG. 1 may be understood by a human and may be parsed by a computing device and executed to acquire and process raw data into desired feature data as described herein. By chaining the blocks in FIG. 1 together, a directed acyclic graph (DAG) is formed, such that the each of the varying sequences of blocks that may be executed each arrive at an endpoint (e.g., there are no cycles within the graph or order of operations). The contents of the blocks in FIG. 1 may also be or may refer to metadata that is representative of data, or of actions, transformations, etc. that may be performed when a computing device executes instructions referenced by or otherwise related to the metadata in one or more of the blocks in FIG. 1.

The DAG recipe 150 includes a data source identification 152, which identify a database or some other source for data from which raw data may be received for assembling feature data as described herein. The data source identification 152 may reference an internal data source for an organization or may reference an external data source for an organization. For example, an organization that creates and publishes various computing services, such as a website, mobile application, or other computing service may collect data related to use of those computing services in an internal data source for potential use as feature data for machine learning or other pattern recognition models. An organization that performs any other functions for which data may be collected may also store such data in an internal data source, and therefore may be referenced by the data source identification 152. For example, an organization may collect data relating to productivity, use of its services or facilities, or any other type of data. As another example, a bank may store data related to use of its banking services, such as the balance of its various customers, credit lines extended to those customers, etc. External data sources may also be referenced by the data source identification 152. For example, a credit reporting agency may be an external data source for credit rating information of various persons.

As such, the data source identification 152 may include information such that, when the DAG recipe 150 is executed by a computing device, the computing device may locate or otherwise communicate with a data source identified in the data source identification 152 to acquire, retrieve, or otherwise receive raw data as described herein. In addition, the data source identification 152 may be readable by a user so that the user may easily see what data source the data source identification 152 is referring to. For example, the data source identification 152 may be or may be include the metadata "CUST_MGMT_CREDIT_BUREAU.DATA". Such metadata may refer to, as just one example, a particular database published by a credit bureau related to individuals' credit scores. In this way, when the DAG recipe 150 is executed, a computing device executing the DAG recipe 150 may use the metadata to determine a data source from which raw data may be received.

Raw data source information 154 may include metadata or otherwise include a definition for and/or instructions for raw data desired from a data source (e.g., the data source indicated by the data source identification 152). Data sources may include more data than is needed or desired for assembling feature data, so the raw data source information 154 may be used to request or retrieve only a portion of data in a data source. For example, if the data source is a table or database, the raw data source information 154 may be defined to only request a portion of the data in the table or database. For example, only a column of data from data organized in a spreadsheet may be requested, only data of a certain type in the data source may be requested, etc. In other words, the raw data source information 154 may define what data in the data source identification 152 should be requested or retrieve, so that when the DAG recipe 150 is executed, the system only requests information needed for the desired feature data.

Such a system reduces the up time needed for a data source for retrieving data from it, the amount of processing or computing power needed to transfer/receive/store the data from the data source, and/or the amount time it may take to retrieve desired data. The raw data source information 154 may be or may include metadata that references a particular type of data or location of data within the data source. For example, the raw data source information 154 may be or may include the metadata "CUST_CREDIT_SCORE_COL9". Such metadata may refer to a specific column of data in the data source, more than one specific column in the data source, a specific row in the data source, more than one specific row in the data source, a range of data cells in the data source that may encompass portions of more than one column or row, or any other type of data (e.g., credit scores from the ninth month (September) of the latest year). Accordingly, when the DAG recipe 150 is executed, the $9^{th}$ column of data in the data source may retrieved based on the raw data source information 154.

Transformation information 156 and transformation information 158 may include metadata or otherwise include a definition for and/or instructions for transforming data retrieved from a data source according to the raw data source information 154. As just one example, the transformation information 156 may represent or include instructions to extract, filter, or separate out data that is not numerical data, that is missing or null, etc. As just one example, the transformation information 158 may represent or include instructions to extract, filter, or separate out data that is numerical data. As such, the information assembled as a result of the transformation information 156, in the present example, may be credit score information that is missing or otherwise does not conform with an expected numerical value. The information assembled as a result of the transformation information 158, in the present example, may be actual credit scores associated with customers that did conform with an expected numerical value. Such data generated after either or both of the transformations referenced in the transformation information 156 and 158 may be used as feature data for a machine learning or other pattern recognition model as described herein.

The transformation information 156 and/or 158 may be or may include metadata representative of a transformation to be performed. For example, the transformation information 156 that, when executed, may separate out data points that are not numerical may include or be metadata such as "CREDIT_SCORE_MISSING_NUM". As another example, the transformation information 158 that, when executed, may separate out data points that are numerical may include or be metadata such as "CREDIT_SCORE_NUM". In this way, a user looking back at how feature data was generated based on the DAG recipe 150 may be able to tell how the data was sorted or otherwise transformed based on the transformation information 156 and/or 158.

In various embodiments, additional or different transformations may be performed on the data either before or after the transformations represented by the transformation information 156 and 158. In such embodiments, the data generated after the transformations represented by the transformation information 156 and 158 may still be used as feature data, and/or other data generated by other transformations may be used as feature data. As such, data generated at different points within a DAG recipe, such as the DAG recipe 150, may be used as feature data. In other words, both intermediate and endpoint data generated using a DAG recipe may be used as desired feature data for a machine learning or other pattern recognition model. For example, other transformations may be performed such as those represented by the metadata of transformation information 160, 162, and/or 164.

Each of the transformation information 160, 162, and 164 may, when executed by a computing device, cause that computing device to further transform data in some way. For example, the transformation information 160 may be or may represent metadata "CREDIT_SCORE_MISSING_NUM_MONTH_1". Accordingly, the data resulting after the transformation information 160 is executed may be all of the non-numeric data related to a specific month (e.g., a latest month, January, a particular month and year, etc.). In such an example, the original data may include multiple months' worth of data.

The transformation information 162 and 164 may be or may represent metadata "CREDIT_SCORE_NUM_MONTH_1" and "CREDIT_SCORE_NUM_MONTH_2", respectively. As such, the transformation information 162 and 164 may sort the data resulting after the transformation associated with the transformation information 158 was applied to raw data retrieved from a data source based on the data source identification 152 and the raw data source information 154, as described herein. For example, the data resulting may be credit scores of customers associated with different months.

In various embodiments additional, alternative, or fewer transformation information may be included than that shown in and described with respect to FIG. 1. For example, additional transformation information may occur after the transformation information 162 and 164. For example, a sum, average, median, standard deviation, and/or other function may be performed on the data resulting from transformations performed according to the transformation information 162 and 164. Those additional transformations may be represented by additional transformation information. In another example, the transformations associated with the transformation information 156, 160, and 164 may not be performed because only feature data associated with the transformation information 162 may be desired.

Feature data generated based on DAG recipes such as the DAG recipe 150 may also be combined with and/or correlated to other feature data before inputting the feature data into a machine learning or other pattern recognition model. For example, if credit score information a given group of people is determined using the DAG recipe 150, other DAG recipes may be used to retrieve and assemble other feature data related to the same people, such as a postal code where they live, an income level, and/or any other information about the same people to which the credit scores apply. That feature data may also be input into a machine learning model, and the data may be correlated with the credit score feature data so the machine learning model may know which credit score data points correlate to the other data points (e.g., what the postal code of each person associated with each credit score is, what the income of each person associated with each credit score is).

Accordingly, the DAG recipe 150 and other DAG recipes may be used to retrieve, process, and assemble data for use as feature data in machine learning and other pattern recognition models. The DAG recipe 150 may be executed by a computing device (e.g., any one of or combination of the computing devices described above with respect to FIGS. 4-7). The DAG recipe 150 may be executed, for example, from the top down as FIG. 1 is oriented. Such that a data source is identified using the data source identification 152, the raw data source information 154 is used to retrieve specific data from the data source, and the specific data is transformed using the transformation informations 156, 158, 160, 162, and/or 164 as described herein.

However, in various embodiments the DAG recipes or processes described herein may be implemented using a parallel computing architecture, such as a Dask Python library. Using a parallel computing architecture, various recipe/process steps (e.g., the various blocks of FIG. 1) may be processed in parallel with one another, rather than processing a step only after a previous step has completed. Such methods further reduce the amount of time and/or computing resources that may be required to assemble desired feature data. The Dask library may include a task scheduling component configured to schedule tasks based on the DAG recipe or object and may also include a distributed data structure configured to implement those tasks (e.g., the transformations) in parallel nodes.

For example, some of the lower blocks related to transformation information may be processed in parallel by different computing devices, different nodes or instances of a computing device, different processors running on a computing device, a single processor capable of running parallel operations, etc. As just one specific example, the transformations defined by the transformation information 156 and 158 may be executed in parallel, as they both merely use the raw data received based on the raw data source information 154. In other words, the transformations based on the transformation information 156 and 158 do not depend on the outcomes of one another. Accordingly, those operations may be carried out in parallel. Similarly, any of the data transformations associated with the transformation information 160, 162, and/or 164 may be carried out in parallel.

Transformations on different tiers or levels of the DAG recipe 150 may also be performed in parallel. For example, one or both of the transformations associated with the transformation information 162 and 164 may be performed while a transformation associated with the transformation information 156 is being performed. Similarly, a transformation associated with the transformation information 160 may be performed while a transformation associated with the transformation information 158 is being performed.

Furthermore, a parallel computing architecture may be capable of segmenting tasks into smaller segments than just the blocks shown in the DAG recipe 150. For example, the raw data source information 154 may be used to retrieve or otherwise acquire certain data from the data source identified by the data source identification 152. However, such data acquisition may take a significant amount of time. Accordingly, certain transformations or processes associated with the DAG recipe 150 may begin executing before another transformation or process is complete, even if the transformation or process is dependent upon another transformation or process. For example, the transformations associated with the transformation information 156 and 158 may begin on a portion of the data received from the data source using the raw data source information 154. In this way, the entire DAG recipe 150 may be completed more quickly than if each transformation or process in the DAG recipe 150 waited for the other transformations or processes from which they depend to complete. Accordingly, the parallel computing architecture described herein may be further leveraged to improve the process of assembling, processing, retrieving, etc. feature data for machine learning and other pattern recognition models.

While DAG recipes (e.g., the DAG recipe 150) may be executed from the top down, or generally top down while including parallel block processing, the DAG recipes may be assembled in different orders. In various embodiments, DAG recipes may be assembled (if arranged as in FIG. 1) from the top down, from the bottom up, or in any other desired order. In various embodiments, it may be desirable to assemble a DAG recipe from the bottom up. For example, if desired feature data is known, the transformations and/or processes for that resulting feature data may be reverse engineered from the known feature data. Such an example of assembling a DAG recipe from the bottom up and then using the DAG recipe to acquire feature data is described below with respect to FIGS. 2 and 3.

Figure 2:
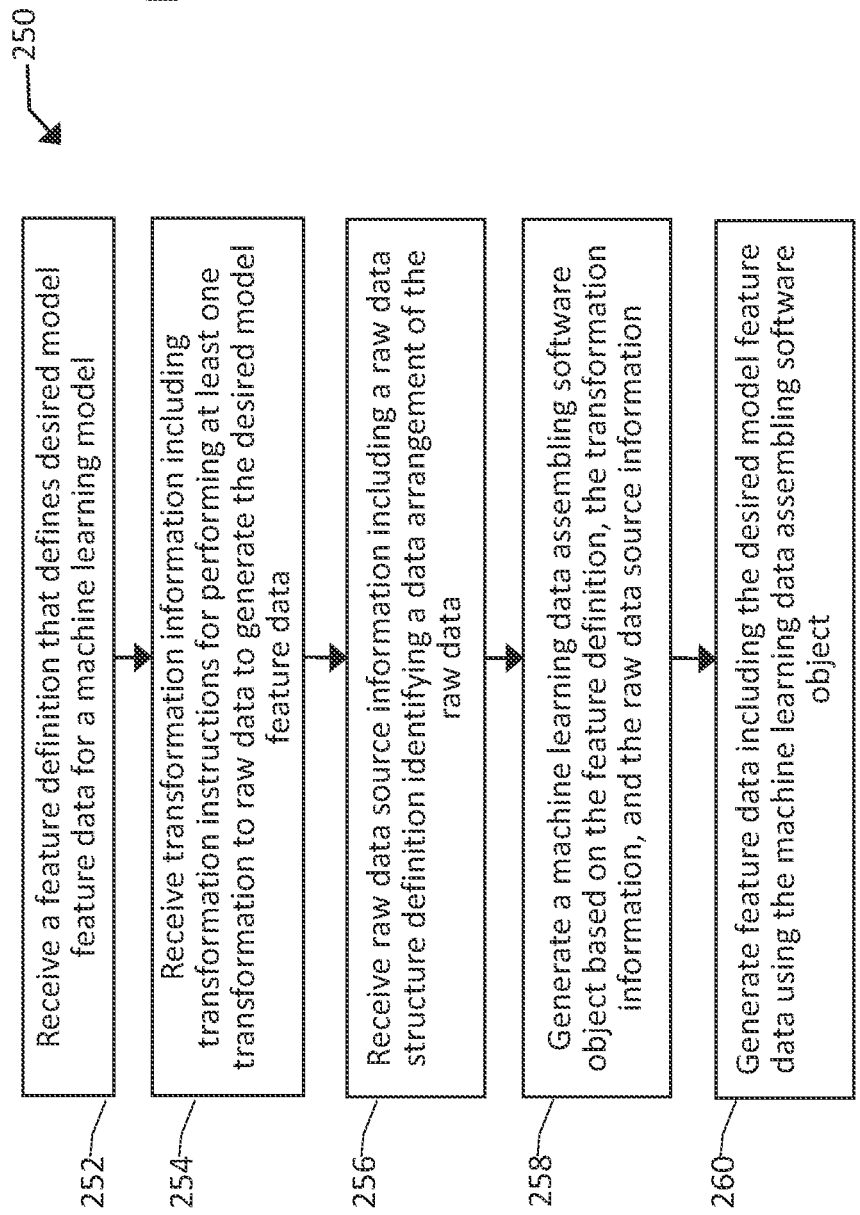
FIG. 2 is a flowchart illustrating a process for assembling a directed acyclic graph recipe for assembling feature data for pattern recognition models in accordance with one or more embodiments of the present disclosure.

FIG. 2 is a flowchart illustrating a process 250 for assembling a directed acyclic graph (DAG) recipe for assembling feature data for pattern recognition models in accordance with one or more embodiments of the present disclosure. Each of the operations discussed herein may be performed by a processor, such as a processor that executes various functions relating to machine learning and other pattern recognition models (e.g., a machine learning processor). At an operation 252, a feature definition that defines desired model feature data for a machine learning model is received. The feature definition indicates what type of endpoint data is desired (e.g., credit scores, account balances, postal code addresses, etc.). Such information may be based on or may be related to transformation information at an end point of a DAG recipe, such as the transformation information 160, 162, and/or 164 of the DAG recipe 150 of FIG. 1. In other words, the feature definition may define desired feature data.

At an operation 254 transformation information including transformation instructions for performing at least one transformation that, upon application of the at least one transformation to raw data, generates the desired model feature data. The transformation information and instructions may be determined, at least in part, based on the feature definition received at the operation 252. In other words, transformation information that yields the feature data may be received or otherwise determined by the system, so that the feature data can be generated. The transformation information may, for example, include any of the transformation information 156, 158, 160, 162, and/or 164 as described herein with respect to FIG. 1.

At an operation 256, raw data source information comprising a raw data structure definition identifying a data arrangement of the raw data is received. In other words, the raw data source information is received or determined so that the proper data can be extracted from a data source for transforming into the feature data. The raw data source information may include raw data structure definitions either explicitly or inherently. For example, the raw data source information may be formatted correctly so that it can properly request or retrieve desired raw data from a data source. By being formatted to correctly request or retrieve data from a particular data source, the raw data source information inherently includes information about the raw data structure (e.g., the raw data structure definition). In some embodiments, the raw data source information may be explicitly included in the metadata of the raw data source information, so that it is evident to user how a data source containing raw data is structured, and what subset of that raw data the raw data source information is sued to request or retrieve.

The raw data source information may be or may be similar to, for example the raw data source information 154 of FIG. 1. In some examples, the raw data source information may additionally include data source identification (e.g., the data source identification 152 of FIG. 1), so that the appropriate data source may be queried for the raw data. In some examples, the data source identification may be determined or received separately from the raw data source information 154. In any case, either or both of the raw data source information and data source identification may be determined, at least in part, based on the transformation information received or determined at the operation 254 and/or the feature definition received or determined at the operation 252.

At an operation 258, a machine learning data assembling software object, based at least in part on the feature definition, the transformation information, and the raw data source information, is generated or assembled. The machine learning data assembling software object may be or may be similar to DAG recipe as described herein, such as the DAG recipe 150 of FIG. 1. In other words, based on the various information defining the feature data and how to assemble, acquire, or otherwise process raw data to generate the feature data, the machine learning data assembling software object may be generated in order to actually execute the DAG recipes as described herein.

At an operation 260, feature data comprising the desired model feature data from the raw data based on the machine learning data assembling software object is generated. The generation of such feature data may include executing the various blocks described above with respect to FIG. 1, and/or may include operations 302 and/or 304 of FIG. 3 described below.

Figure 3:
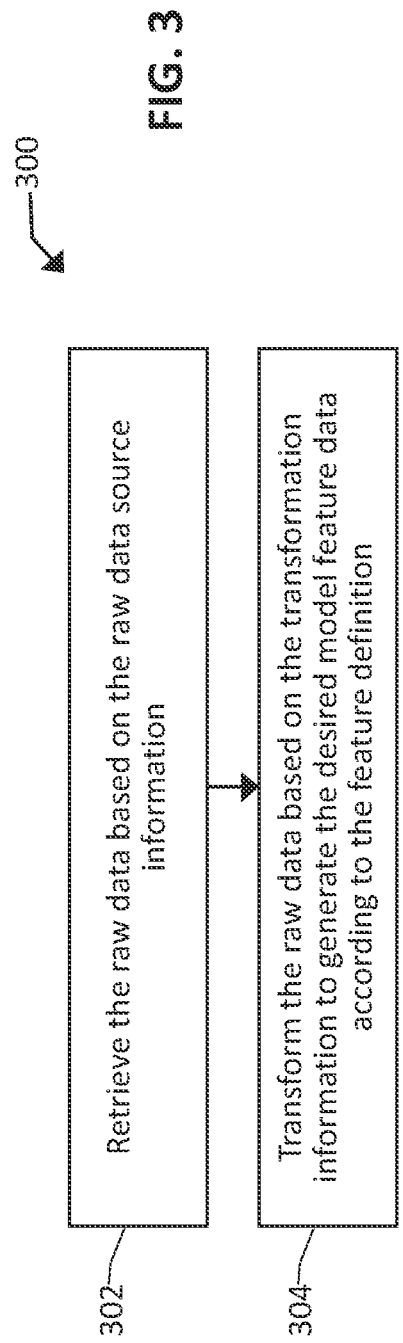
FIG. 3 is a flowchart illustrating a process for executing a directed acyclic graph recipe for assembling feature data for pattern recognition models in accordance with one or more embodiments of the present disclosure.

FIG. 3 is a flowchart illustrating a process 300 for executing a directed acyclic graph (DAG) recipe for assembling feature data for pattern recognition models in accordance with one or more embodiments of the present disclosure. Each of the operations discussed herein may be performed by a processor, such as a processor that executes various functions relating to machine learning and other pattern recognition models (e.g., a machine learning processor). At an operation 302, raw data is retrieved (or requested and received) using the raw data source information. At an operation 304, the raw data is transformed based on the transformation information to generate the desired model feature data according to the feature definition. As described herein, multiple DAG recipes may also be assembled and executed to generate different feature data for a machine learning model. In addition, a single DAG recipe may be executed to generate more than one type of feature data as described herein. The DAG recipe executed according to the method of FIG. 3 may be, as one example, the DAG recipe 150 described above with respect to FIG. 1.

As also described herein, generating the feature data may be performed by at least two parallel computing nodes or devices, such that the transforming of the raw data to generate various desired model feature data may occur in parallel. Similarly, the generating of the feature data may include transforming a first portion of raw data retrieved while a second portion of the raw data is yet to be retrieved or is in process of being retrieved. object.

In various embodiments, the desired feature model data may be stored in a storage device (e.g., a computer memory). In this way, the data may be retained to use with or input into a machine learning model. In addition, in various embodiments, intermediate data generated or received using the DAG recipes described herein may also optionally be stored. For example, raw data received using the raw data source information 154 may be stored on a memory, so that future transformations not shown in FIG. 1 may be applied to the raw data to generate different or additional feature data. In addition, information that is not endpoint feature data but that has still undergone at least one transformation may be stored on a memory for further analysis or processing. In some embodiments, the data source identification 152 may refer to raw data or transformed data that was previously subject to a different DAG recipe. For example, if raw data was previously received from an external database, the raw data may be stored on memory more accessible within an organization, so that further transformations, analysis, etc. may be performed using the data without having to re-request the data from the external data source. In various embodiments, raw data, transformed data, and/or feature data (e.g., fully transformed data as desired) may be stored in the same or different memory devices.

In various embodiments, some or all of the operations described herein with respect to FIGS. 2 and/or 3 may be automated. For example, a user may manually input a desired feature definition that defines desired feature data. The system may then automatically determine transformation information that may be used on raw data to get the desired feature data (e.g., the operation 254), may automatically determine raw data source information and/or data source identification for retrieving raw data that may be transformed to get the desired feature data (e.g., the operation 256), etc. In various embodiments, the generating of the machine learning data assembling software object may also be performed automatically based on the transformation information and/or the raw data source information (e.g., the operation 258). In various embodiments, the operations related to executing a DAG recipe (e.g., the operations 260, 302, 304) may also be implemented in an automated fashion, either separate from the operations 252, 254, 256, and/or 258, or automatically in response to the generation of the machine learning data assembling software object at the operation 258.

Accordingly, methods, systems, and computer readable media for building recipes or processes for locating raw data and transforming that raw data into feature data usable for training machine learning or other pattern recognition models is described herein. Those recipes or processes may take the form of directed acyclic graphs (DAGs) and may be implemented using a parallel computing architecture such as the Dask Python library described herein. In this way, the generation of feature data may be achieved in a way that conserves computing and human resources.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein, and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

Figure 4:
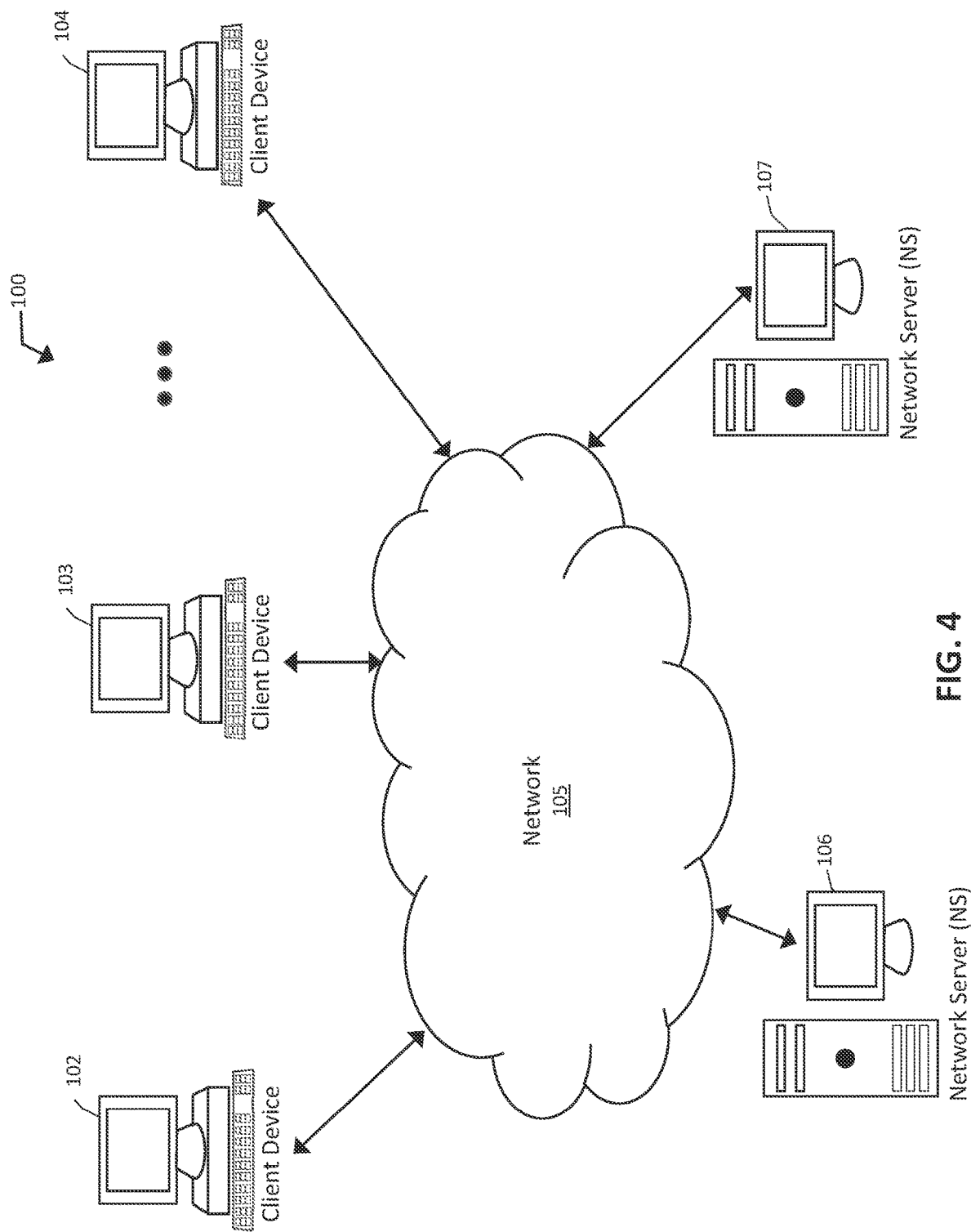
FIG. 4 is a block diagram depicting a computer-based system and platform in accordance with one or more embodiments of the present disclosure.

FIG. 4 is a block diagram depicting a computer-based system and platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 100 may be configured to manage a large number of members and/or concurrent transactions, as detailed herein. In some embodiments, the exemplary computer-based system/platform 100 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 4, members 102-104 (e.g., clients) of the exemplary computer-based system/platform 100 may include virtually any computing device capable of receiving and sending a message over a network (e.g., cloud network), such as network 105, to and from another computing device, such as servers 106 and 107, each other, and the like. In some embodiments, the member devices 102-104 may be personal computers, multiprocessor systems, microprocessor-based or programmable consumer electronics, network PCs, and the like. In some embodiments, one or more member devices within member devices 102-104 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 102-104 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 102-104 may include may run one or more applications, such as Internet browsers, mobile applications, voice calls, video games, videoconferencing, and email, among others. In some embodiments, one or more member devices within member devices 102-104 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 102-104 may be specifically programmed by either Java, .Net, QT, C, C++ and/or other suitable programming language. In some embodiments, one or more member devices within member devices 102-104 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 105 may provide network access, data transport and/or other services to any computing device coupled to it. In some embodiments, the exemplary network 105 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 105 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 105 may include and implement, as an alternative or in conjunction with one or more of the above, a WiMAX architecture defined by the WiMAX forum. In some embodiments and, optionally, in combination of any embodiment described above or below, the exemplary network 105 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 105 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 105 may also include mass storage, such as network attached storage (NAS), a storage area network (SAN), a content delivery network (CDN) or other forms of computer or machine readable media.

In some embodiments, the exemplary server 106 or the exemplary server 107 may be a web server (or a series of servers) running a network operating system, examples of which may include but are not limited to Microsoft Windows Server, Novell NetWare, or Linux. In some embodiments, the exemplary server 106 or the exemplary server 107 may be used for and/or provide cloud and/or network computing. Although not shown in FIG. 4, in some embodiments, the exemplary server 106 or the exemplary server 107 may have connections to external systems like email, SMS messaging, text messaging, ad content providers, etc. Any of the features of the exemplary server 106 may be also implemented in the exemplary server 107 and vice versa.

In some embodiments, one or more of the exemplary servers 106 and 107 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 101-104.

In some embodiments and, optionally, in combination of any embodiment described above or below, for example, one or more exemplary computing member devices 102-104, the exemplary server 106, and/or the exemplary server 107 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
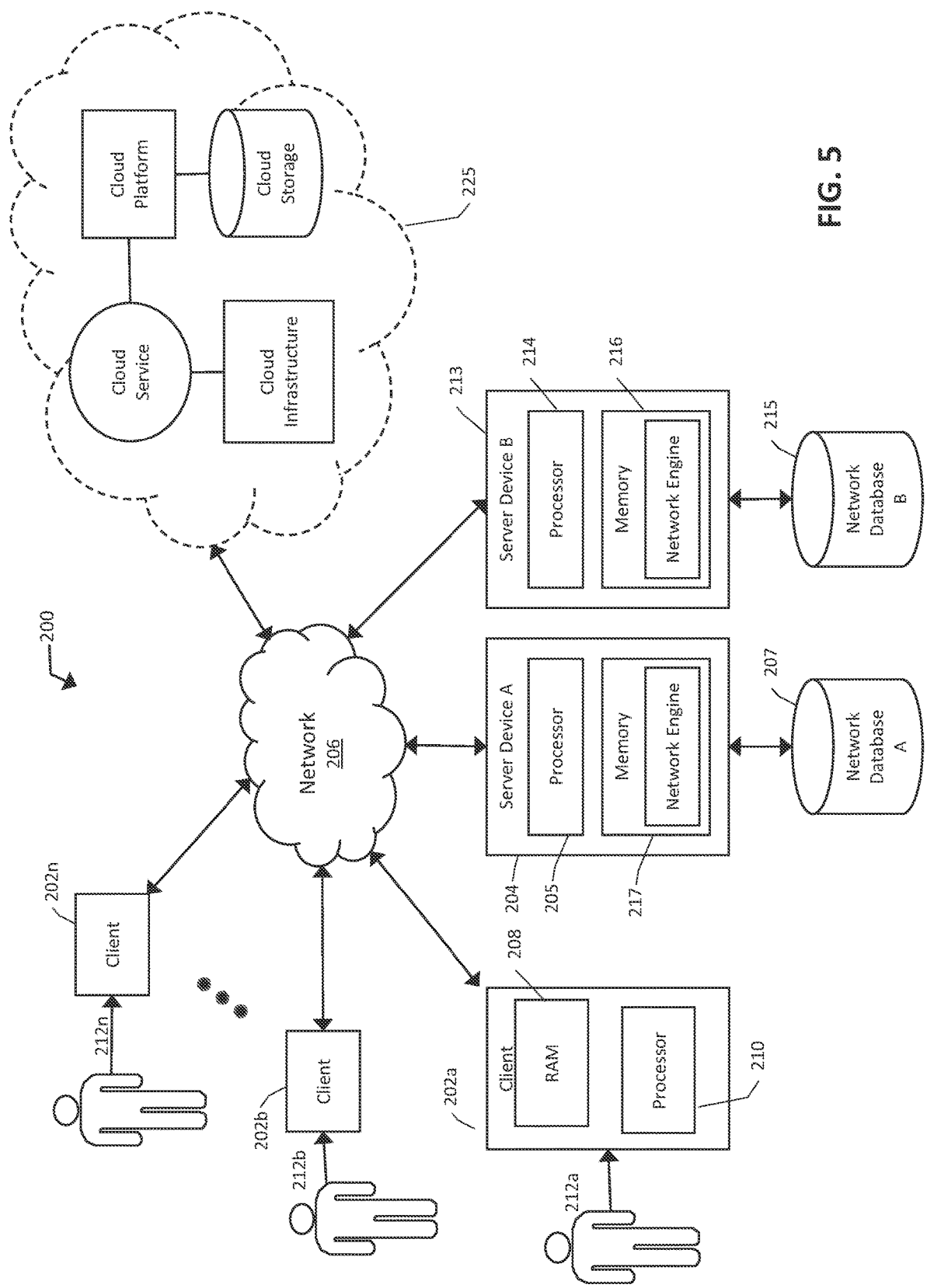
FIG. 5 is a block diagram depicting another computer-based system and platform in accordance with one or more embodiments of the present disclosure.

FIG. 5 depicts a block diagram of another exemplary computer-based system/platform 200 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 202a, 202b through 202n shown each at least includes a computer-readable medium, such as a random-access memory (RAM) 208 coupled to a processor 210 or FLASH memory. In some embodiments, the processor 210 may execute computer-executable program instructions stored in memory 208. In some embodiments, the processor 210 may include a microprocessor, an ASIC, and/or a state machine. In some embodiments, the processor 210 may include, or may be in communication with, media, for example computer-readable media, which stores instructions that, when executed by the processor 210, may cause the processor 210 to perform one or more steps described herein. In some embodiments, examples of computer-readable media may include, but are not limited to, an electronic, optical, magnetic, or other storage or transmission device capable of providing a processor, such as the processor 210 of client 202a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 202a through 202n may also comprise a number of external or internal devices such as a mouse, a CD-ROM, DVD, a physical or virtual keyboard, a display, or other input or output devices. In some embodiments, examples of member computing devices 202a through 202n (e.g., clients) may be any type of processor-based platforms that are connected to a network 206 such as, without limitation, personal computers, digital assistants, personal digital assistants, smart phones, pagers, digital tablets, laptop computers, Internet appliances, and other processor-based devices. In some embodiments, member computing devices 202a through 202n may be specifically programmed with one or more application programs in accordance with one or more principles/methodologies detailed herein. In some embodiments, member computing devices 202a through 202n may operate on any operating system capable of supporting a browser or browser-enabled application, such as Microsoft™ Windows™, and/or Linux. In some embodiments, member computing devices 202a through 202n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 202a through 202n, users 212a through 212n, may communicate over the exemplary network 206 with each other and/or with other systems and/or devices coupled to the network 206. As shown in FIG. 5, exemplary server devices 204 and 213 may be also coupled to the network 206. In some embodiments, one or more member computing devices 202a through 202n may be mobile clients.

In some embodiments, at least one database of exemplary databases 207 and 215 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
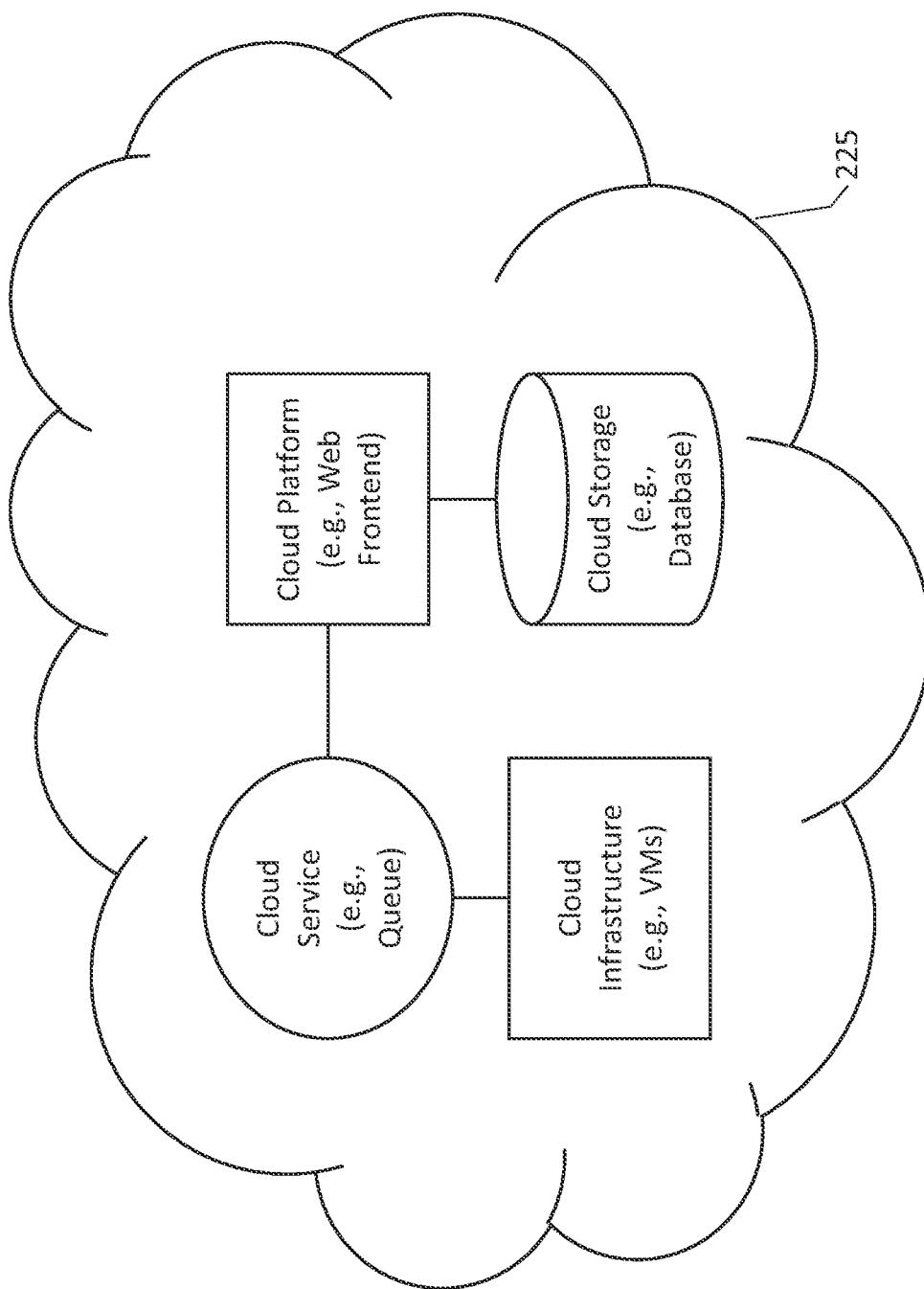
FIGS. 6 and 7 are diagrams illustrating implementations of cloud computing architecture/aspects with respect to which the disclosed technology may be specifically configured to operate, in accordance with one or more embodiments of the present disclosure.
Figure 7:
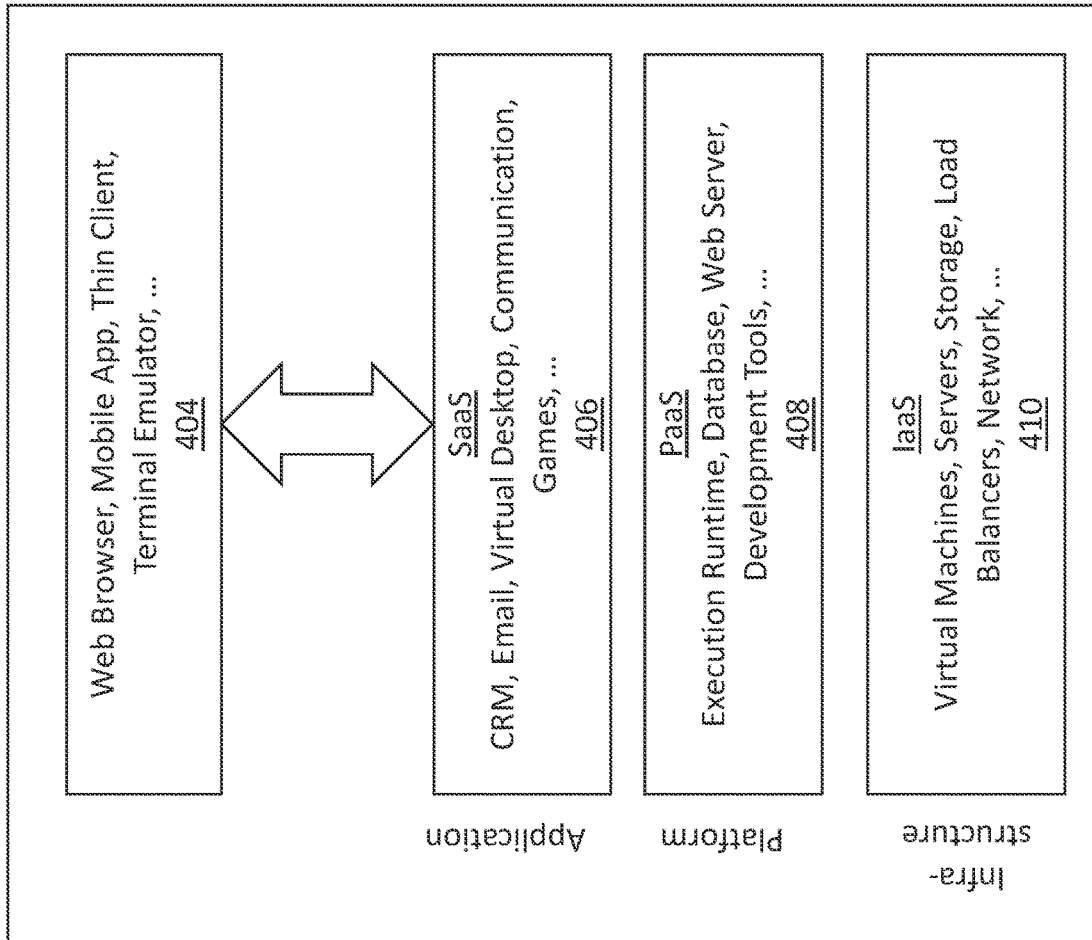

As also shown in FIGS. 5-7, some embodiments of the disclosed technology may also include and/or involve one or more cloud components 225, which are shown grouped together in the drawing for sake of illustration, though may be distributed in various ways as known in the art. Cloud components 225 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 7, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 410, platform as a service (PaaS) 408, and/or software as a service (SaaS) 406. FIGS. 6 and 7 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate.

At least some aspects of the present disclosure will now be described with reference to the following numbered clauses.

1. A method comprising:
    receiving, by a machine learning processor, a feature definition that defines desired model feature data for a machine learning model;
    receiving, by the machine learning processor, transformation information comprising transformation instructions for performing at least one transformation that, upon application of the at least one transformation to raw data, generates the desired model feature data;
    receiving, by the machine learning processor, raw data source information comprising a raw data structure definition identifying a data arrangement of the raw data;
    generating, by the machine learning processor, a machine learning data assembling software object based at least in part on:
        i) the feature definition,
        ii) the transformation information, and
        iii) the raw data source information; and
    generating, by the machine learning processor, feature data comprising the desired model feature data from the raw data based on the machine learning data assembling software object, wherein the generating of the feature data comprises:
        retrieving the raw data based on the raw data source information; and
        transforming the raw data based on the transformation information to generate the desired model feature data according to the feature definition.
2. The method of clause 1, wherein the feature definition is a first feature definition and the desired model feature data is first desired model feature data, and further wherein the method comprises:
    receiving, by the machine learning processor, a second feature definition that defines second desired model feature data, wherein the transformation information further comprises instructions for performing the at least one transformation that, upon application of the at least one transformation to the raw data, generates the second desired model feature data, wherein:
        the generating of the feature data further comprises transforming the raw data based on the transformation information to generate the second desired model feature data.
3. The method of clause 2, wherein the generating of the feature data is performed by at least two parallel computing nodes or devices, such that the transforming of the raw data to generate the first desired model feature data and the transforming of the raw data to generate the second desired model feature data occurs in parallel.
4. The method of clause 1, wherein the feature definition is a first feature definition, the desired model feature data is first desired model feature data, the transformation information is first transformation information, the at least one transformation is at least one first transformation, and further wherein the method comprises:
    receiving, by the machine learning processor, a second feature definition that defines second desired model feature data; and
    receiving, by the machine learning processor, second transformation information comprising instructions for performing at least one second transformation different from the at least one first transformation that, upon application of the at least one second transformation to the raw data, generates the second desired model feature data, wherein:
        the generating of the feature data further comprises transforming the raw data based on the second transformation information to generate the second desired model feature data.
5. The method of clause 4, wherein the generating of the feature data is performed by at least two parallel computing nodes or devices, such that the transforming the raw data to generate the first desired model feature data using the first transformation information and the transforming the raw data to generate the second desired model feature data using the second transformation information occurs in parallel.
6. The method of clause 1, wherein the generating of the feature data further comprises transforming a first portion of the raw data that has been retrieved while a second portion of the raw data is yet to be retrieved or is in process of being retrieved.
7. The method of clause 1, wherein the machine learning data assembling software object comprises a directed acyclic graph (DAG) object.
8. The method of clause 7, wherein the generating of the feature data is performed using a Dask library.
9. The method of clause 8, wherein the Dask library comprises a task scheduling component configured to schedule tasks based on the DAG object and a distributed data structure configured to implement the tasks in parallel nodes.
10. The method of clause 1, further comprising storing the desired feature model data in a storage device.
11. The method of clause 10, further comprising storing the raw data in the storage device in a separate data structure from the desired model feature data.
12. A system comprising:
    a memory; and
    at least one processor coupled to the memory, the at least one processor configured to:

receive a feature definition that defines desired model feature data for a machine learning model;

receive transformation information comprising transformation instructions for performing at least one transformation that, upon application of the at least one transformation to raw data, generates the desired model feature data;

receive raw data source information comprising raw data source information comprising a raw data structure definition identifying a data arrangement of the raw data; and generate a machine learning data assembling software object based at least in part on the feature definition, the transformation information, and the raw data source information.

13. The system of clause 12, wherein the feature definition is a first feature definition and the desired model feature data is first desired model feature data, and further wherein the at least one processor is further configured to:

receive a second feature definition that defines second desired model feature data, wherein the transformation information further comprises instructions for performing the at least one transformation that, upon application of the at least one transformation to the raw data, generates the second desired model feature data.

14. The system of clause 12, wherein the feature definition is a first feature definition, the desired model feature data is first desired model feature data, the transformation information is first transformation information, the at least one transformation is at least one first transformation, and further wherein the method comprises:

receive a second feature definition that defines second desired model feature data; and receive second transformation information comprising instructions for performing at least one second transformation different from the at least one first transformation that, upon application of the at least one second transformation to the raw data, generates the second desired model feature data.

15. The system of clause 12, wherein the machine learning data assembling software object comprises a directed acyclic graph (DAG) object.

16. A non-transitory computer readable medium having instructions stored thereon that, upon execution by a computing device, cause the computing device to perform operations comprising:

generating feature data comprising desired model feature data from raw data using a machine learning data assembling software object that comprises:

a feature definition that defines the desired model feature data for a machine learning model;

transformation information comprising transformation instructions for performing at least one transformation that, upon application of the at least one transformation to the raw data, generates the desired model feature data; and raw data source information comprising a raw data structure definition identifying a data arrangement of the raw data;

wherein the generating of the feature data comprises:
retrieving the raw data based on the raw data source information; and transforming the raw data retrieved from a database based on the transformation information to generate the desired model feature data according to the feature definition.

17. The non-transitory computer readable medium of clause 16, wherein the feature definition is a first feature definition and the desired model feature data is first desired model feature data, and further wherein:

the machine learning data assembling software object further comprises a second feature definition that defines second desired model feature data, wherein the transformation information further comprises instructions for performing the at least one transformation that, upon application of the at least one transformation to the raw data, generates the second desired model feature data; and the generating of the feature data further comprises transforming the raw data retrieved from the database based on the transformation information to generate the second desired model feature data according to the second feature definition.

18. The non-transitory computer readable medium of clause 16, wherein the feature definition is a first feature definition, the desired model feature data is first desired model feature data, the transformation information is first transformation information, the at least one transformation is at least one first transformation, and further wherein:

the machine learning data assembling software object further comprises a second feature definition that defines second desired model feature data;

the machine learning data assembling software object further comprises second transformation information comprising instructions for performing at least one second transformation different from the at least one first transformation that, upon application of the at least one second transformation to the raw data, generates the second desired model feature data; and the generating of the feature data further comprises transforming the raw data retrieved from the database based on the second transformation information to generate the second desired model feature data according to the second feature definition.

19. The non-transitory computer readable medium of clause 16, wherein the generating of the feature data further comprises transforming a first portion of the raw data that has been retrieved while a second portion of the raw data is yet to be retrieved or is in process of being retrieved.

20. The non-transitory computer readable medium of clause 16, wherein the machine learning data assembling software object comprises a directed acyclic graph (DAG) object and the generating of the feature data is performed using a Dask library.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIGS. 6 and 7) and cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux™, (2) Microsoft Windows™, (3) OS X (Mac OS), (4) Solaris™, (5) UNIX™ (6) VMWare™, (7) Android™, (8) Java Platforms™, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A method comprising:
receiving, by a machine learning processor, a feature definition that defines desired model feature data for input into a machine learning model;
receiving, by the machine learning processor, transformation information comprising transformation instructions for performing at least one transformation that, upon application of the at least one transformation to raw data, generates the desired model feature data;
receiving, by the machine learning processor, raw data source information comprising a raw data structure definition identifying a data arrangement of the raw data;
generating, by the machine learning processor, a machine learning data assembling software object comprising a directed acyclic graph (DAG) representation of a plurality of data transformation tasks, wherein nodes of the DAG correspond to individual data transformation operations and edges represent data dependencies between the operations, based at least in part on:
the feature definition,
the transformation information, and
the raw data source information;
executing, by a distributed task scheduler, the DAG by scheduling and executing the data transformation tasks across a plurality of worker nodes in parallel, in accordance with the data dependencies specified by the DAG; and
generating, by the machine learning processor using the machine learning data assembling software object and the distributed task scheduler, feature data configured for input into the machine learning model, wherein the feature data comprises the desired model feature data from the raw data, wherein the generating of the feature data comprises:
retrieving the raw data based on the raw data source information; and
transforming the raw data based on the transformation information to generate the desired model feature data according to the feature definition.

2. The method of claim 1, wherein the feature definition is a first feature definition and the desired model feature data is first desired model feature data, and further wherein the method comprises:
receiving, by the machine learning processor, a second feature definition that defines second desired model feature data, wherein the transformation information further comprises instructions for performing the at least one transformation that, upon application of the at least one transformation to the raw data, generates the second desired model feature data, wherein:
the generating of the feature data further comprises transforming the raw data based on the transformation information to generate the second desired model feature data.

3. The method of claim 2, wherein the generating of the feature data is performed by at least two parallel computing nodes or devices, such that the transforming of the raw data to generate the first desired model feature data and the transforming of the raw data to generate the second desired model feature data occurs in parallel.

4. The method of claim 1, wherein the feature definition is a first feature definition, the desired model feature data is first desired model feature data, the transformation information is first transformation information, the at least one transformation is at least one first transformation, and further wherein the method comprises:

receiving, by the machine learning processor, a second feature definition that defines second desired model feature data; and receiving, by the machine learning processor, second transformation information comprising instructions for performing at least one second transformation different from the at least one first transformation that, upon application of the at least one second transformation to the raw data, generates the second desired model feature data, wherein:

the generating of the feature data further comprises transforming the raw data based on the second transformation information to generate the second desired model feature data.

5. The method of claim 4, wherein the generating of the feature data is performed by at least two parallel computing nodes or devices, such that the transforming the raw data to generate the first desired model feature data using the first transformation information and the transforming the raw data to generate the second desired model feature data using the second transformation information occurs in parallel.

6. The method of claim 1, wherein the generating of the feature data further comprises transforming a first portion of the raw data that has been retrieved while a second portion of the raw data is yet to be retrieved or is in process of being retrieved.

7. The method of claim 1, wherein the generating of the feature data is performed using a Dask library.

8. The method of claim 7, wherein the Dask library comprises a task scheduling component configured to schedule tasks based on the DAG object and a distributed data structure configured to implement the tasks in parallel nodes.

9. The method of claim 1, further comprising storing the desired feature model data in a storage device.

10. The method of claim 9, further comprising storing the raw data in the storage device in a separate data structure from the desired model feature data.

11. A system comprising:
a memory; and
at least one processor coupled to the memory, the at least one processor configured to:
receive a feature definition that defines desired model feature data for input into a machine learning model;
receive transformation information comprising transformation instructions for performing at least one transformation that, upon application of the at least one transformation to raw data, generates the desired model feature data;
receive raw data source information comprising raw data source information comprising a raw data structure definition identifying a data arrangement of the raw data;
generate a machine learning data assembling software object comprising a directed acyclic graph (DAG) representation of a plurality of data transformation tasks, wherein nodes of the DAG correspond to individual data transformation operations and edges represent data dependencies between the operations, based at least in part on the feature definition, the transformation information, and the raw data source information;

executing, by a distributed task scheduler, the DAG by scheduling and executing the data transformation tasks across a plurality of worker nodes in parallel, in accordance with the data dependencies specified by the DAG; and generating, by the machine learning processor using the machine learning data assembling software object and the distributed task scheduler, feature data configured for input into the machine learning model, wherein the feature data comprises the desired model feature data from the raw data, wherein the generating of the feature data comprises:

retrieving the raw data based on the raw data source information; and transforming the raw data based on the transformation information to generate the desired model feature data according to the feature definition.

12. The system of claim 11, wherein the feature definition is a first feature definition and the desired model feature data is first desired model feature data, and further wherein the at least one processor is further configured to:

receive a second feature definition that defines second desired model feature data, wherein the transformation information further comprises instructions for performing the at least one transformation that, upon application of the at least one transformation to the raw data, generates the second desired model feature data.

13. The system of claim 11, wherein the feature definition is a first feature definition, the desired model feature data is first desired model feature data, the transformation information is first transformation information, the at least one transformation is at least one first transformation, and further wherein the method comprises:

receive a second feature definition that defines second desired model feature data; and receive second transformation information comprising instructions for performing at least one second transformation different from the at least one first transformation that, upon application of the at least one second transformation to the raw data, generates the second desired model feature data.

14. A non-transitory computer readable medium having instructions stored thereon that, upon execution by a computing device, cause the computing device to perform operations comprising:

generating, from raw data using a machine learning data assembling software object and a distributed task scheduler, feature data configured for input into the machine learning model, wherein the feature data comprises desired model feature data, and wherein the machine learning data assembling software object comprises a directed acyclic graph (DAG) representation of a plurality of data transformation tasks, wherein nodes of the DAG correspond to individual data transformation operations and edges represent data dependencies between the operations, and the machine learning data assembling software object is generated based at least in part on:

a feature definition that defines the desired model feature data for a machine learning model;

transformation information comprising transformation instructions for performing at least one transformation that, upon application of the at least one transformation to the raw data, generates the desired model feature data; and raw data source information comprising a raw data structure definition identifying a data arrangement of the raw data; and executing, by the distributed task scheduler, the DAG by scheduling and executing the data transformation tasks across a plurality of worker nodes in parallel, in accordance with the data dependencies specified by the DAG, wherein the generating of the feature data, using the machine learning data assembling software object and the distributed task scheduler, comprises:

retrieving the raw data based on the raw data source information; and transforming the raw data retrieved from a database based on the transformation information to generate the desired model feature data according to the feature definition.

15. The non-transitory computer readable medium of claim 14, wherein the feature definition is a first feature definition and the desired model feature data is first desired model feature data, and further wherein:

the machine learning data assembling software object further comprises a second feature definition that defines second desired model feature data, wherein the transformation information further comprises instructions for performing the at least one transformation that, upon application of the at least one transformation to the raw data, generates the second desired model feature data; and the generating of the feature data further comprises transforming the raw data retrieved from the database based on the transformation information to generate the second desired model feature data according to the second feature definition.

16. The non-transitory computer readable medium of claim 14, wherein the feature definition is a first feature definition, the desired model feature data is first desired model feature data, the transformation information is first transformation information, the at least one transformation is at least one first transformation, and further wherein:

the machine learning data assembling software object further comprises a second feature definition that defines second desired model feature data;

the machine learning data assembling software object further comprises second transformation information comprising instructions for performing at least one second transformation different from the at least one first transformation that, upon application of the at least one second transformation to the raw data, generates the second desired model feature data; and the generating of the feature data further comprises transforming the raw data retrieved from the database based on the second transformation information to generate the second desired model feature data according to the second feature definition.

17. The non-transitory computer readable medium of claim 14, wherein the generating of the feature data further comprises transforming a first portion of the raw data that has been retrieved while a second portion of the raw data is yet to be retrieved or is in process of being retrieved.

18. The non-transitory computer readable medium of claim 14, wherein the generating of the feature data is performed using a Dask library.

* * * * *